United States Patent
Mochizuki et al.

(10) Patent No.: US 12,378,925 B2
(45) Date of Patent: Aug. 5, 2025

(54) APPARATUS AND METHOD FOR CONTROLLING INTERNAL COMBUSTION ENGINE

(71) Applicant: Hitachi Astemo, Ltd., Hitachinaka (JP)

(72) Inventors: Ryo Mochizuki, Hitachinaka (JP); Masaki Kobayashi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/838,017

(22) PCT Filed: Feb. 6, 2023

(86) PCT No.: PCT/JP2023/003800
§ 371 (c)(1),
(2) Date: Aug. 13, 2024

(87) PCT Pub. No.: WO2023/153365
PCT Pub. Date: Aug. 17, 2023

(65) Prior Publication Data
US 2025/0154916 A1   May 15, 2025

(30) Foreign Application Priority Data
Feb. 14, 2022   (JP) .................. 2022-020538

(51) Int. Cl.
*F02D 41/14*   (2006.01)
*F02D 41/06*   (2006.01)
*F02D 41/38*   (2006.01)

(52) U.S. Cl.
CPC ....... *F02D 41/1454* (2013.01); *F02D 41/065* (2013.01); *F02D 41/38* (2013.01)

(58) Field of Classification Search
CPC .... F02D 41/1454; F02D 41/065; F02D 41/38; F02D 41/2454
See application file for complete search history.

(56) References Cited

U.S. PATENT DOCUMENTS 7,430,854 B2 * 10/2008 Yasui .................. F02D 41/1475
                                                                 123/481
10,975,753 B2 *  4/2021 Smith .................. F02D 41/008
(Continued)

FOREIGN PATENT DOCUMENTS

WO   WO 2019/135276 A1   7/2019

OTHER PUBLICATIONS

International Search Report (PCT/ISA/210) issued in PCT Application No. PCT/JP2023/003800 dated Apr. 25, 2023 with English translation (7 pages).
(Continued)

*Primary Examiner* — Grant Moubry
(74) *Attorney, Agent, or Firm* — Crowell & Moring LLP

(57) ABSTRACT

Provided is an apparatus and a method for controlling an internal combustion engine such that emissions may not worsen during recovery from a fuel cut. An internal combustion engine control apparatus executes feedback control on the air-fuel ratio of an internal combustion engine. The control apparatus increases a supply of fuel, with the air-fuel ratio feedback stopped, when combustion restarts after a fuel cut of the internal combustion engine. The control apparatus sets the air-fuel ratio criteria based on a rich-side peak value of the air-fuel ratio obtained after the fuel supply increase starts. The control apparatus starts the air-fuel ratio feedback when the air-fuel ratio falls within the set air-fuel ratio criteria after the fuel supply increase.

11 Claims, 11 Drawing Sheets

(56) References Cited

U.S. PATENT DOCUMENTS

2008/0295488 A1* 12/2008 Takubo .............. F02D 41/1445
60/299
2018/0363582 A1* 12/2018 Ono ................... F02D 41/1473

OTHER PUBLICATIONS

Japanese-language Written Opinion (PCT/ISA/237) issued in PCT Application No. PCT/JP2023/003800 dated Apr. 25, 2023 with English translation (7 pages).
International Preliminary Report on Patentability (PCT/IB326, PCT/IB/338, & PCT/IB373) issued in PCT Application No. PCT/JP2023/003800 dated Aug. 29, 2024, including Japanese-language Written Opinion (PCT/ISA/237) with English translation (11 pages).

* cited by examiner

CALCULATE FIRST AIR-FUEL RATIO CORRECTION START CRITERIA

| INPUT  | -2.0 | -1.5 | -1.0 | -0.5 | 0.5  | 1.0  | 1.5  | 2.0  |
|--------|------|------|------|------|------|------|------|------|
| OUTPUT | 12.4 | 12.9 | 13.4 | 13.9 | 14.9 | 15.4 | 15.9 | 16.4 |

CALCULATE SECOND AIR-FUEL RATIO CORRECTION START CRITERIA

| INPUT  | -2.0 | -1.5 | -1.0 | -0.5 | 0.5  | 1.0 | 1.5  | 2.0 |
|--------|------|------|------|------|------|-----|------|-----|
| OUTPUT | 13   | 13.5 | 14   | 14.5 | 15.5 | 16  | 16.5 | 17  |

| INPUT | -2.0 | -1.5 | -1.0 | -0.5 | 0.5 | 1.0 | 1.5 | 2.0 |
|---|---|---|---|---|---|---|---|---|
| OUTPUT | 0.05 | 0.03 | 0.02 | 0.01 | 0.01 | 0.02 | 0.03 | 0.05 |

APPARATUS AND METHOD FOR CONTROLLING INTERNAL COMBUSTION ENGINE

TECHNICAL FIELD

The present invention relates to an apparatus and a method for controlling an internal combustion engine. In particular, it relates to improvement in air-fuel ratio control during recovery from a fuel cut.

BACKGROUND ART

Patent Document 1 discloses a method and an apparatus for controlling the air-fuel ratio of an internal combustion engine that executes a fuel cut and stops air-fuel ratio feedback control when a vehicle decelerates. According to Patent Document 1, when the fuel supply has restarted and the fuel supply increase has ended, as the air-fuel ratio falls within a predetermined range near a target air-fuel ratio or as the duration time of open-loop control reaches a predetermined upper time limit, the air-fuel ratio feedback control restarts.

REFERENCE DOCUMENT LIST

Patent Document

Patent Document 1: International Publication WO2019/135276

SUMMARY OF THE INVENTION

Problem to be Solved by the Invention

Nevertheless, if the restart of the air-fuel ratio feedback control is determined based on the target air-fuel ratio, when deviations in air-fuel ratio temporarily occur due to, for example, manufacturing variations of components or malfunctions of injectors, the restart of the feedback control is delayed. In this delay period, the emissions may worsen. In addition, when the restart of the air-fuel ratio feedback control is determined based on the duration time of the open-loop control, the emissions may also worsen until the predetermined time limit is reached.

The present invention has been made in view of the above, and it is an object of the present invention to provide an apparatus and a method for controlling an internal combustion engine such that emissions may not worsen during recovery from a fuel cut.

Means for Solving the Problem

According to one aspect of the present invention, there is provided an internal combustion engine control apparatus that executes feedback control on the air-fuel ratio of an internal combustion engine, wherein the control apparatus is configured to: increase a supply of fuel, with the air-fuel ratio feedback stopped, when combustion restarts after a fuel cut of the internal combustion engine; set the air-fuel ratio criteria based on a rich-side peak value of the air-fuel ratio obtained after the fuel supply increase starts; and start the air-fuel ratio feedback when the air-fuel ratio falls within the set air-fuel ratio criteria after the fuel supply increase.

According to another aspect of the present invention, there is provided an internal combustion engine control method for executing feedback control on the air-fuel ratio of an internal combustion engine, wherein the control method includes: cutting fuel supply to the internal combustion engine; increasing a supply of fuel to the internal combustion engine, with the air-fuel ratio feedback stopped, when combustion of the internal combustion engine restarts after the cutting of the fuel supply; setting the air-fuel ratio criteria based on a rich-side peak value of the air-fuel ratio obtained after the fuel supply increase starts; and starting the control of the internal combustion engine based on the air-fuel ratio feedback when the air-fuel ratio falls within the set air-fuel ratio criteria after the fuel supply increase.

Effects of the Invention

According to the present invention, the air-fuel ratio criteria are set based on a rich-side peak value of the air-fuel ratio obtained after the start of the fuel supply increase during recovery from the fuel cut, and the air-fuel ratio feedback control can be appropriately and quickly restarted after recovery from the fuel cut, without waiting for elapse of a predetermined time-out period.

Thus, the present invention can provide an apparatus and a method for controlling an internal combustion engine such that emissions may not worsen during recovery from the fuel cut.

BRIEF DESCRIPTION OF THE DRAWINGS

FIG. 6 is a waveform diagram in which the air-fuel ratio is deviated and there is no response delay of the air-fuel ratio.

FIG. 7 is a waveform diagram in which the air-fuel ratio is deviated and there is a response delay of the air-fuel ratio.

FIG. 8 is a waveform diagram in which the air-fuel ratio is deviated and there is no response delay of the air-fuel ratio.

FIG. 9 is a waveform diagram in which the air-fuel ratio is deviated and there is a response delay of the air-fuel ratio.

MODE FOR CARRYING OUT THE INVENTION

Hereinafter, an example of the present invention will be described with reference to the drawings.

Figure 1:
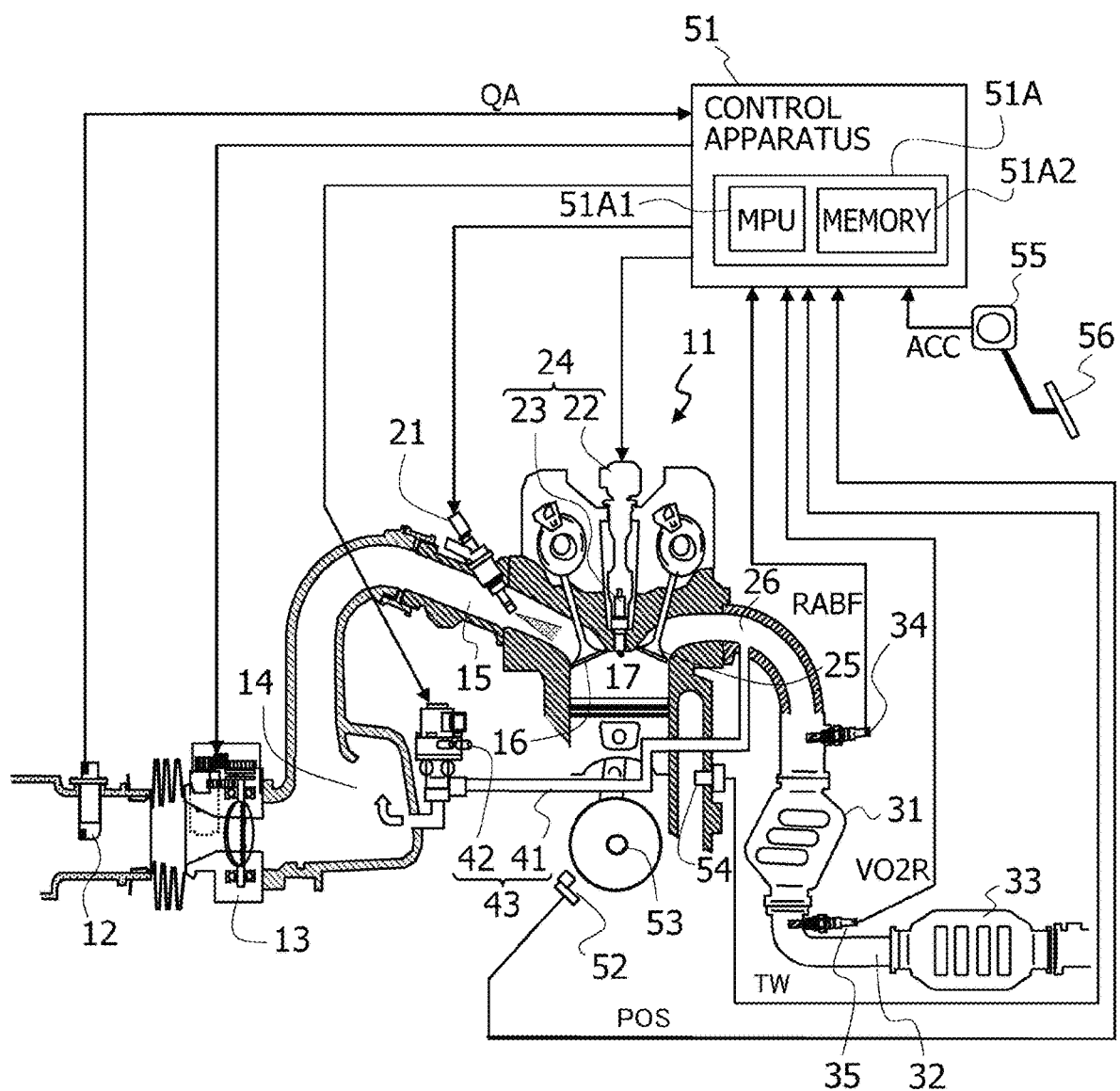
FIG. 1 schematically illustrates the configuration of a control apparatus of an internal combustion engine according to an example of the present invention.

FIG. 1 is for describing the control apparatus of an internal combustion engine according to an example of the present invention. Specifically, FIG. 1 illustrates a schematic configuration of an internal combustion engine 11 and a control apparatus 51 thereof.

In internal combustion engine 11, the intake air first flows through an air flow meter 12, an electrically controlled throttle valve 13, and a collector 14, in this order, and the intake is next drawn into a combustion chamber 17 via an intake pipe 15 and an intake valve 16 provided in each cylinder.

A fuel injection valve 21 is installed at intake pipe 15 of each cylinder, and injects fuel into intake pipe 15.

Internal combustion engine 11 may be a direct-injection internal combustion engine in which fuel injection valves 21 directly inject fuel into their respective combustion chambers 17.

In addition, internal combustion engine 11 includes an ignition device 24 including an ignition coil 22 and a spark plug 23 for each cylinder.

The mixture in combustion chambers 17 is ignited and combusted by sparks generated by their respective spark plugs 23, and the exhaust gas generated by the combustion inside individual combustion chamber 17 is discharged into an exhaust pipe 26 provided in each cylinder via an exhaust valve 25.

The exhaust system of internal combustion engine 11 includes a first exhaust purification catalyst 31 and a second exhaust purification catalyst 33.

First exhaust purification catalyst 31 and second exhaust purification catalyst 33 are each an exhaust purification device that purifies the exhaust of internal combustion engine 11 based on the action of a catalyst (for example, a three-way catalyst) having an oxygen storage capability.

First exhaust purification catalyst 31 is disposed immediately under a part at which exhaust pipes 26 are gathered, and second exhaust purification catalyst 33 is disposed at exhaust duct 32 downstream of first exhaust purification catalyst 31.

In addition, as exhaust sensors for detecting the air-fuel ratio of the exhaust of internal combustion engine 11, internal combustion engine 11 includes an air-fuel ratio sensor 34 and an oxygen sensor 35.

Air-fuel-ratio sensor 34 is a wide-range air-fuel ratio sensor that obtains a linear output signal RABF based on the air-fuel ratio of the exhaust, and is located upstream of first exhaust purification catalyst 31.

Oxygen sensor 35 is a rich-lean sensor for detecting whether the air-fuel ratio of the exhaust is richer or leaner than a theoretical air-fuel ratio (in other words, excess air ratio)=1), and is located downstream of first exhaust purification catalyst 31. Specifically, oxygen sensor 35 is located downstream of first exhaust purification catalyst 31 and upstream of second exhaust purification catalyst 33.

Oxygen sensor 35 generates an electromotive force based on the concentration of oxygen in the exhaust, and an output signal VO2R (an output voltage) sharply changes around the theoretical air-fuel ratio.

For example, oxygen sensor 35 outputs a voltage of about 1 V when the air-fuel ratio of the exhaust is richer than the theoretical air-fuel ratio, and outputs a voltage close to 0 V when the air-fuel ratio of the exhaust is leaner than the theoretical air-fuel ratio.

In addition, internal combustion engine 11 includes an exhaust gas recirculation device 43.

Exhaust gas recirculation device 43 includes an exhaust gas recirculation pipe 41 by which exhaust pipe 26 and collector 14 are communicated with each other, and includes an exhaust gas recirculation control valve 42 that controls the exhaust gas recirculation amount through adjustment of the opening area of exhaust gas recirculation pipe 41.

Control apparatus 51 is an electronic control apparatus for controlling the operation of internal combustion engine 11, and includes a microcomputer 51A.

Microcomputer 51A includes, for example, a microprocessor 51A1, a non-volatile memory 51A2, and a volatile memory (not illustrated).

Control apparatus 51 acquires detected signals from various kinds of sensors, and controls the operation of internal combustion engine 11 by executing arithmetic processing based on these detected signals and by calculating and outputting operation signals for controlling, for example, the fuel injection by each fuel injection valve 21, the opening of electrically controlled throttle valve 13, the ignition by each spark plug 23, and the opening of exhaust gas recirculation control valve 42.

In addition to output signal RABF of air-fuel ratio sensor 34 and output signal VO2R of oxygen sensor 35, control apparatus 51 acquires, for example, an intake flow rate signal QA that is output by air flow meter 12 and that relates to the intake flow rate of internal combustion engine 11, a rotation signal POS that is output by a crank angle sensor 52 and that relates to the rotation angle position of a crankshaft 53, a water temperature signal TW that is output by a water temperature sensor 54 and that relates to the coolant temperature of internal combustion engine 11, and an accelerator position signal ACC that is output by an accelerator position sensor 55 and that relates to the position of an accelerator pedal 56.

Control apparatus 51 calculates a target ignition timing and a target exhaust gas recirculation amount based on engine operating conditions (specifically, the engine rotation speed, the engine load, the engine temperature, etc.,) detected based on various kinds of signals acquired, outputs an ignition control signal to ignition coil 22 based on the target ignition timing, and outputs an angle control signal to exhaust gas recirculation control valve 42 based on the target exhaust gas recirculation amount.

In addition, control apparatus 51 calculates a target angle TA of electrically controlled throttle valve 13 from accelerator position signal ACC, etc., and controls the throttle motor of electrically controlled throttle valve 13 based on target angle TA.

In addition, control apparatus 51 calculates a fuel injection pulse width TI [ms], which is proportional to the fuel amount injected from fuel injection valve 21 per combustion cycle, based on the engine operating conditions.

Control apparatus 51 controls the air-fuel ratio of internal combustion engine 11 by outputting an injection pulse signal of fuel injection pulse width TI to fuel injection valve 21 at a predetermined injection timing per cylinder and by controlling the fuel amount supplied to internal combustion engine 11.

In an operating range in which air-fuel ratio feedback control conditions are met, control apparatus 51 automatically adjusts the air-fuel ratio of internal combustion engine 11 by correcting fuel injection pulse width TI based on output signal RABF of air-fuel ratio sensor 34 and output signal VO2R of oxygen sensor 35, that is, based on the air-fuel ratio of the exhaust upstream of first exhaust purification catalyst 31 and the air-fuel ratio of the exhaust downstream of first exhaust purification catalyst 31.

In addition, control apparatus 51 has a function of setting air-fuel ratio criteria based on a rich-side peak value of the air-fuel ratio obtained after the fuel supply increase starts and a function of changing a preset reference value of the air-fuel ratio criteria based on the rich-side peak value of the air-fuel ratio when the air-fuel ratio feedback restarts.

Figure 2:
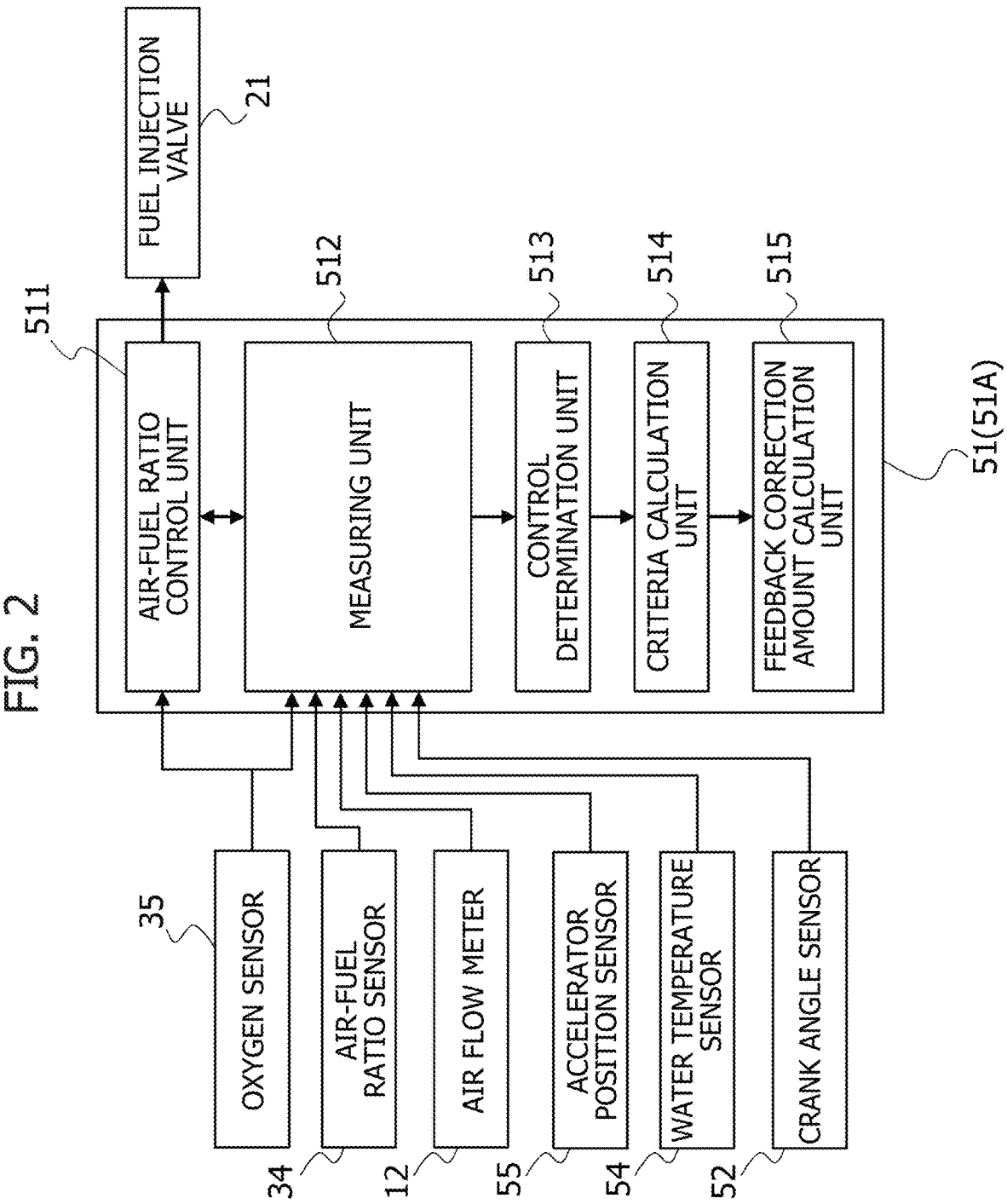
FIG. 2 is a functional block diagram illustrating main parts of the control apparatus illustrated in FIG. 1.

FIG. 2 is a functional block diagram illustrating main parts of control apparatus 51 illustrated in FIG. 1.

Control apparatus 51 includes, as software, functions of an air-fuel ratio control unit 511, a measuring unit 512, a control determination unit 513, a criteria calculation unit 514, and a feedback correction amount calculation unit 515.

Air-fuel ratio control unit 511 executes active air-fuel ratio control, which is control for adjusting the fuel injection amount such that the air-fuel ratio of the exhaust downstream of first exhaust purification catalyst 31 alternatingly changes between rich and lean.

For example, when air-fuel ratio control unit 511 inverts the air-fuel ratio of the exhaust downstream of first exhaust purification catalyst 31 from rich to lean by controlling fuel injection valve 21, air-fuel ratio control unit 511 changes the air-fuel ratio to lean by gradually decreasing the fuel injection amount through PI control. After the air-fuel ratio of the exhaust downstream of first exhaust purification catalyst 31 is inverted to lean, air-fuel ratio control unit 511 changes the air-fuel ratio to rich by gradually increasing the fuel injection amount through PI control.

Measuring unit 512 acquires detected signals from air flow meter 12, air-fuel ratio sensor 34, oxygen sensor 35, crank angle sensor 52, water temperature sensor 54, and accelerator position sensor 55.

Control determination unit 513 executes arithmetic processing based on these detected signals, and executes a control determination operation. Specifically, control determination unit 513 detects a peak value of the air-fuel ratio after the start of recovery from a fuel cut, and detects an air-fuel ratio deviation amount from this rich-side peak value of the air-fuel ratio. The peak value is a maximum value of the change amount of the air-fuel ratio (a point of change from rich and lean). The determination of the detection of the peak value is made by detecting a timing at which the sign of the change amount of the actual air-fuel ratio inverts (for example, from positive to negative) after the start of the fuel supply increase after a fuel cut. This peak value of the air-fuel ratio is calculated by calculating a rich-side peak value detected first after the start of the fuel supply increase after a fuel cut.

As described above, the rich-side peak of the air-fuel ratio is detected, and the deviation amount of the air-fuel ratio is calculated based on this peak value. Based on the result of the arithmetic processing of the control determination unit 513, criteria calculation unit 514 calculates appropriate criteria matching the deviation amount of the air-fuel ratio (criteria different from the criteria used in normal control). The criteria calculated by criteria calculation unit 514 are the criteria used for the restart of the air-fuel ratio feedback. Next, from the calculated criteria, feedback correction amount calculation unit 515 calculates a feedback correction amount, and executes air-fuel ratio correction based on this feedback correction amount.

Figure 3:
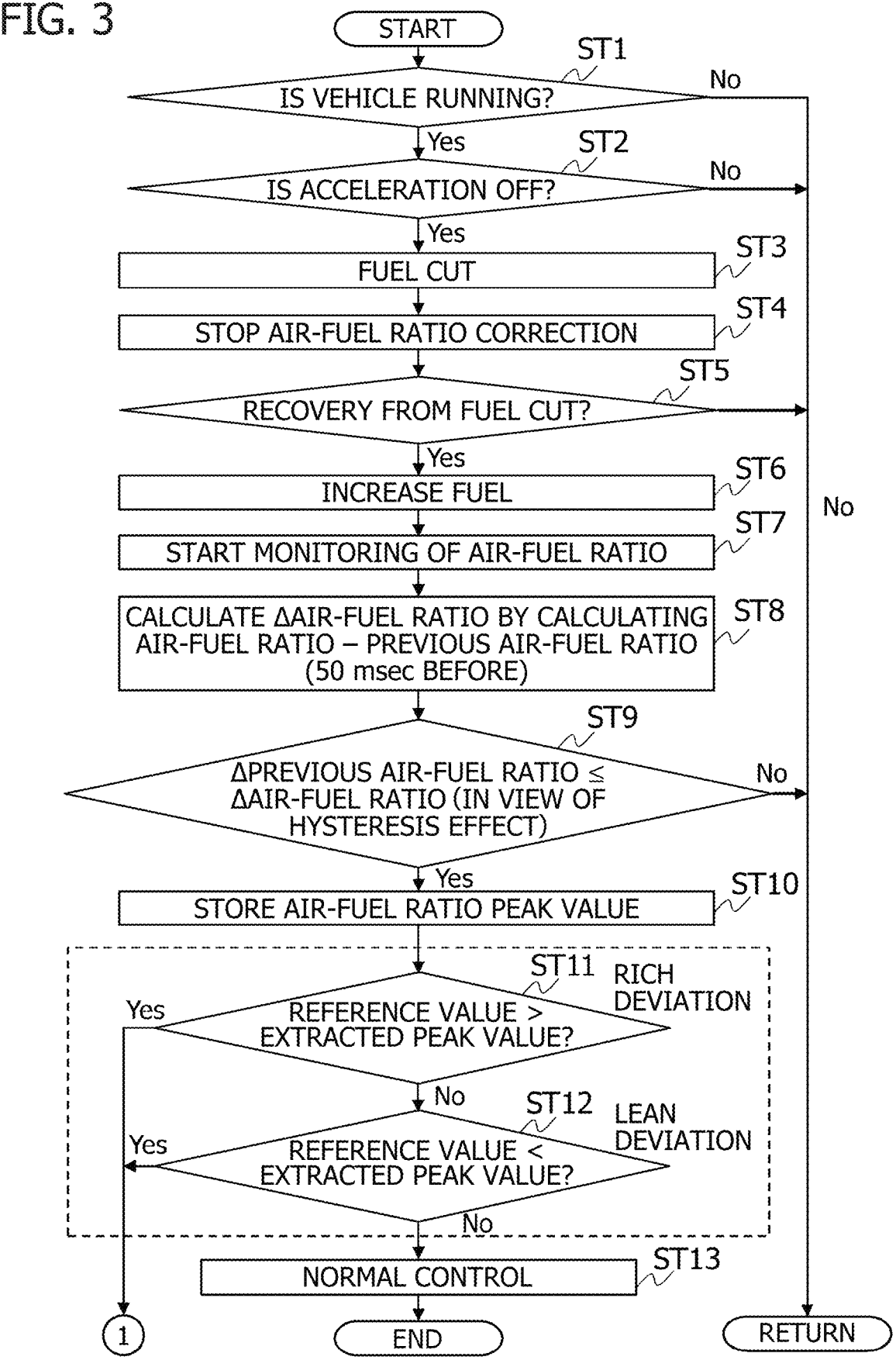
FIG. 3 is a flowchart illustrating a control determination operation included in a control method of the internal combustion engine according to the example of the present invention.

That is, control determination unit 513 executes a control determination operation as illustrated in the flowchart in FIG. 3. First, control determination unit 513 determines whether the vehicle in which internal combustion engine 11 is mounted is running or not, based on information such as a vehicle speed signal supplied from a vehicle speed sensor not illustrated, accelerator position signal ACC supplied from accelerator position sensor 55, water temperature signal TW supplied from water temperature sensor 54, and rotation signal POS supplied from crank angle sensor 52 (step ST1). If control determination unit 513 determines that the vehicle is running, control determination unit 513 determines whether the acceleration is OFF (step ST2).

If control determination unit 513 determines that the acceleration is OFF, control determination unit 513 executes a fuel cut by controlling fuel injection valves 21 (step ST3), and stops the air-fuel ratio correction (step ST4).

If, in step ST1, control determination unit 513 determines that the vehicle is not running, or if, in step ST2, control determination unit 513 determines that the acceleration is not OFF, control determination unit 513 ends the present control determination and returns to a different control operation.

Next, in step ST5, control determination unit 513 determines whether the vehicle is recovering from a fuel cut. The recovery from a fuel cut (a fuel cut recovery) is executed, for example, when the driver depresses accelerator pedal 56. If control determination unit 513 determines the fuel cut recovery, control determination unit 513 increases the fuel injected (step ST6), and starts the monitoring of the air-fuel ratio based on air-fuel ratio sensor 34 and oxygen sensor 35 (step ST7). Next, control determination unit 513 calculates the air-fuel ratio change amount (Δair-fuel ratio) (step ST8). Control determination unit 513 calculates Δair-fuel ratio by calculating "air-fuel ratio-previous air-fuel ratio (50 msec before)".

Next, control determination unit 513 compares the previous air-fuel ratio change amount (Δ previous air-fuel ratio) with the current air-fuel ratio change amount (Δair-fuel ratio) (step ST9). If Δ previous air-fuel ratio is less than Δair-fuel ratio, control determination unit 513 stores the air-fuel ratio peak value (for example, in memory 51A2) (step ST10). Next, control determination unit 513 compares the extracted air-fuel ratio peak value with a reference value, and determines whether "reference value>extracted peak value" (step ST11). If control determination unit 513 determines that the reference value is less than or equal to the extracted peak value, control determination unit 513 determines whether "reference value<extracted peak value" (step ST12). If control determination unit 513 determines that the reference value is greater than or equal to the extracted peak value, control determination unit 513 executes normal control and ends the present flowchart (step ST13).

If, in step ST11, control determination unit 513 determines that the reference value is greater than the extracted peak value, or if, in step ST12, control determination unit 513 determines that the reference value is less than the extracted peak value, criteria calculation unit 514 calculates criteria. In step ST11, the rich deviation amount of the air-fuel ratio is detected and, in step ST12, the lean deviation amount of the air-fuel ratio is detected. If the extracted air-fuel ratio peak value differs from the reference value, criteria for the restart of the air-fuel ratio feedback are calculated, and the previous criteria are changed to new air-fuel ratio criteria matching the rich or lean deviation amount of the air-fuel ratio.

Figure 4:
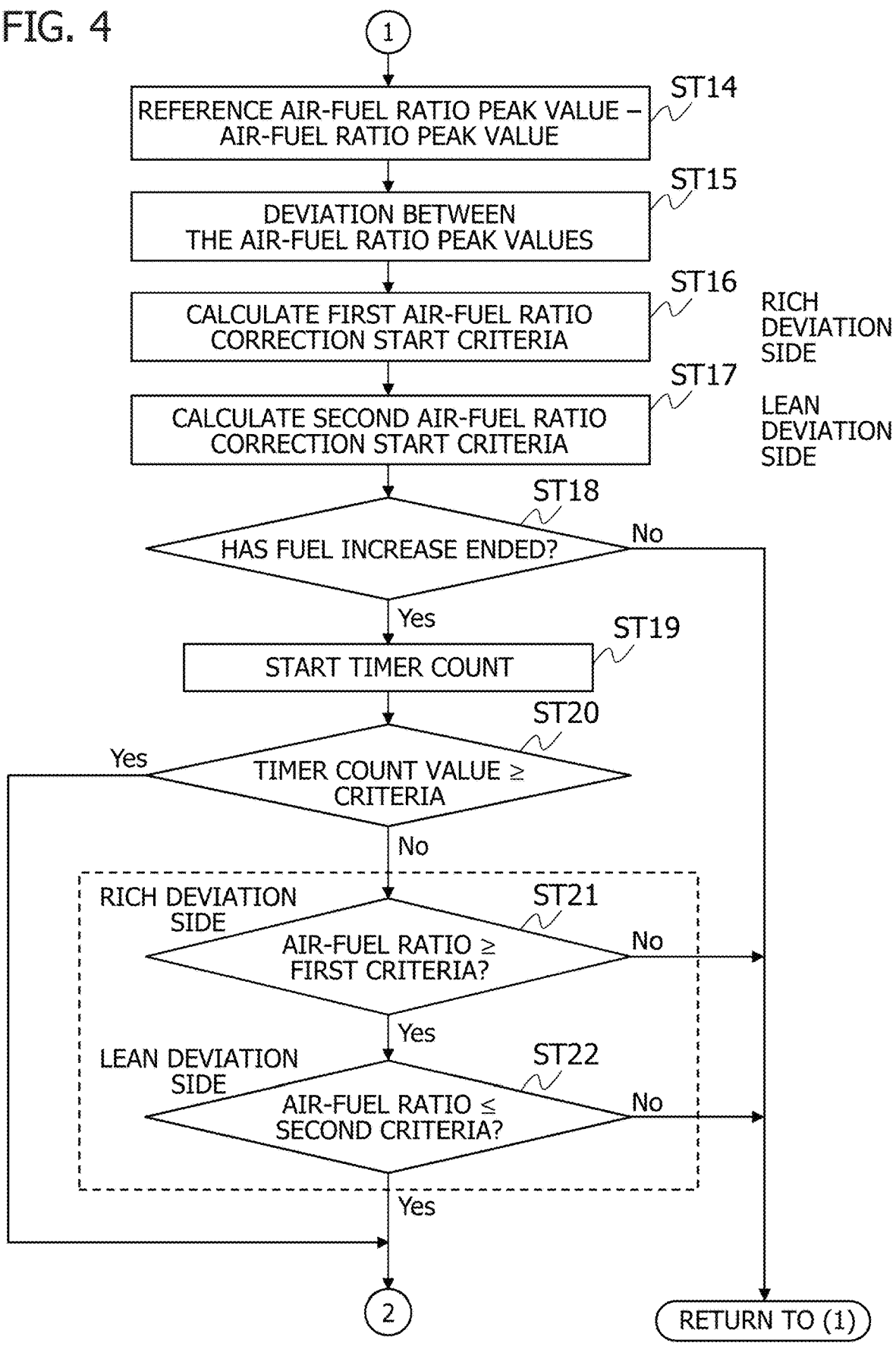
FIG. 4 is a flowchart illustrating a criteria calculation operation following FIG. 3.

Criteria calculation unit 514 executes a criteria calculation operation as illustrated in the flowchart in FIG. 4. In step ST14, criteria calculation unit 514 calculates "reference air-fuel ratio peak value-air-fuel ratio peak value", to obtain the deviation between the air-fuel ratio peak values (step ST15). Next, criteria calculation unit 514 calculates first air-fuel ratio correction start criteria (step ST16). The first air-fuel ratio correction start criteria represent a rich-deviation-side correction amount. Next, criteria calculation unit 514 calculates second air-fuel ratio correction start criteria (step ST17). The second air-fuel ratio correction start criteria represent a lean-deviation-side correction amount.

Figures 5A, 5B, 6:
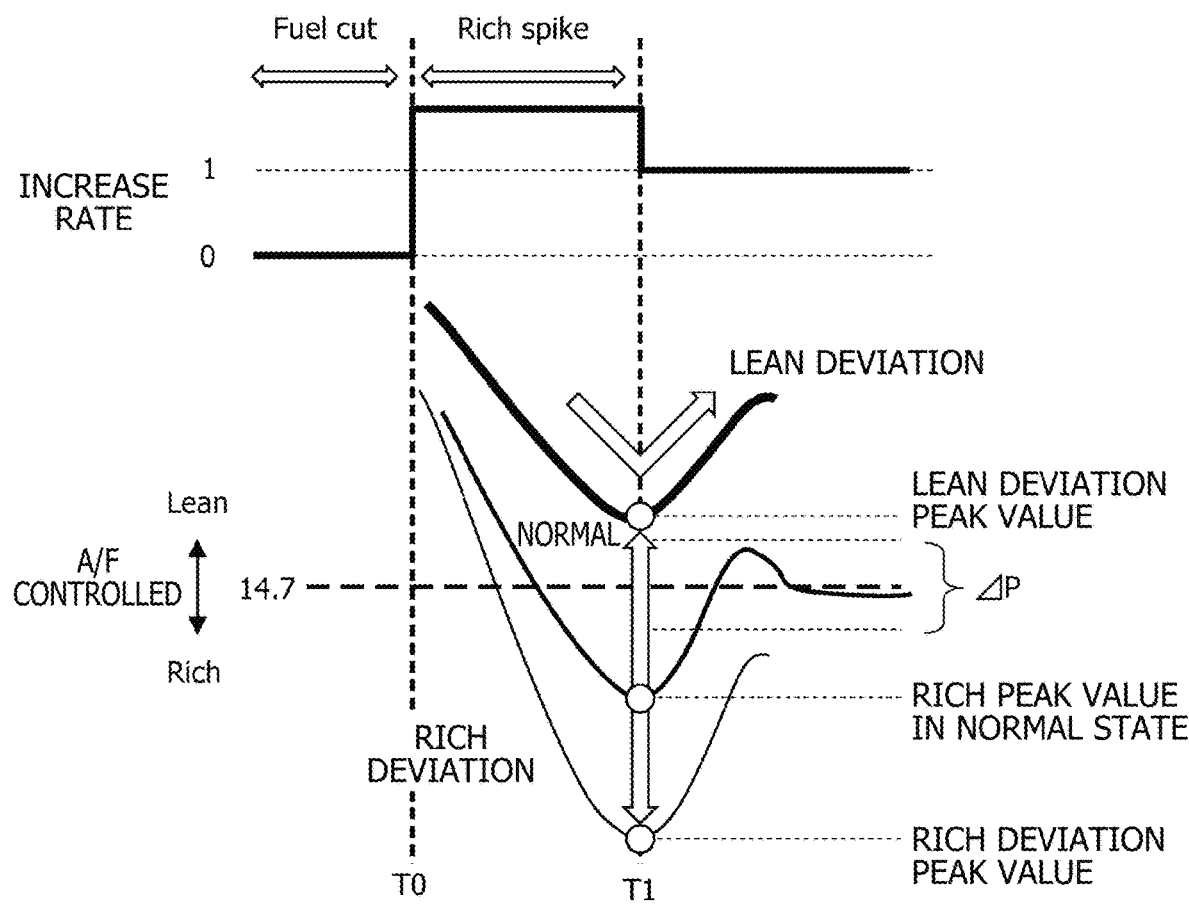
FIG. 5A is a diagram for describing calculation of first air-fuel ratio correction start criteria in FIG. 4.
FIG. 5B is a diagram for describing calculation of second air-fuel ratio correction start criteria in FIG. 4.
FIG. 6 illustrates a method for determining rich or lean deviation of the air-fuel ratio. Specifically.

FIG. 5A illustrates an input-output relationship used when criteria calculation unit 514 calculates the first air-fuel ratio correction start criteria in step ST16. If the input (rich deviation side) changes from "−2.0", "−1.5", "−1.0", "−0.5", "0.5", "1.0", "1.5", to "2.0", the output changes from "12.4", "12.9", "13.4", "13.9", "14.9", "15.4", "15.9", to "16.4".

FIG. 5B illustrates an input-output relationship used when criteria calculation unit 514 calculates the second air-fuel ratio correction start criteria in step ST17. If the input (lean deviation side) changes from "−2.0", "−1.5", "−1.0", "−0.5", "0.5", "1.0", "1.5", to "2.0", the output changes from "13.0", "13.5", "14.0", "14.5", "15.5", "16.0", "16.5", to "17.0".

Next, criteria calculation unit 514 determines whether the fuel supply increase has ended (step ST18). If criteria calculation unit 514 determines that the fuel supply increase has ended, criteria calculation unit 514 starts a timer count (step ST19).

Next, in step ST20, criteria calculation unit 514 compares the timer count value with criteria. If "timer count value<criteria", criteria calculation unit 514 determines whether "air-fuel ratio≥first criteria" (step ST21). If the air-fuel ratio is greater than or equal to the first criteria, criteria calculation unit 514 determines whether "air-fuel ratio≤ second criteria" (step ST22).

If the air-fuel ratio is less than or equal to the second criteria or if, in step ST20, the timer count value is greater than or equal to the criteria, the feedback correction amount is calculated.

If, in step ST18, the fuel supply increase has not ended, if, in step ST21, the air-fuel ratio is less than the first criteria, and if, in step ST22, the air-fuel ratio is greater than the second criteria, the operation from step ST14 to step ST22 is repeated.

Figure 7:
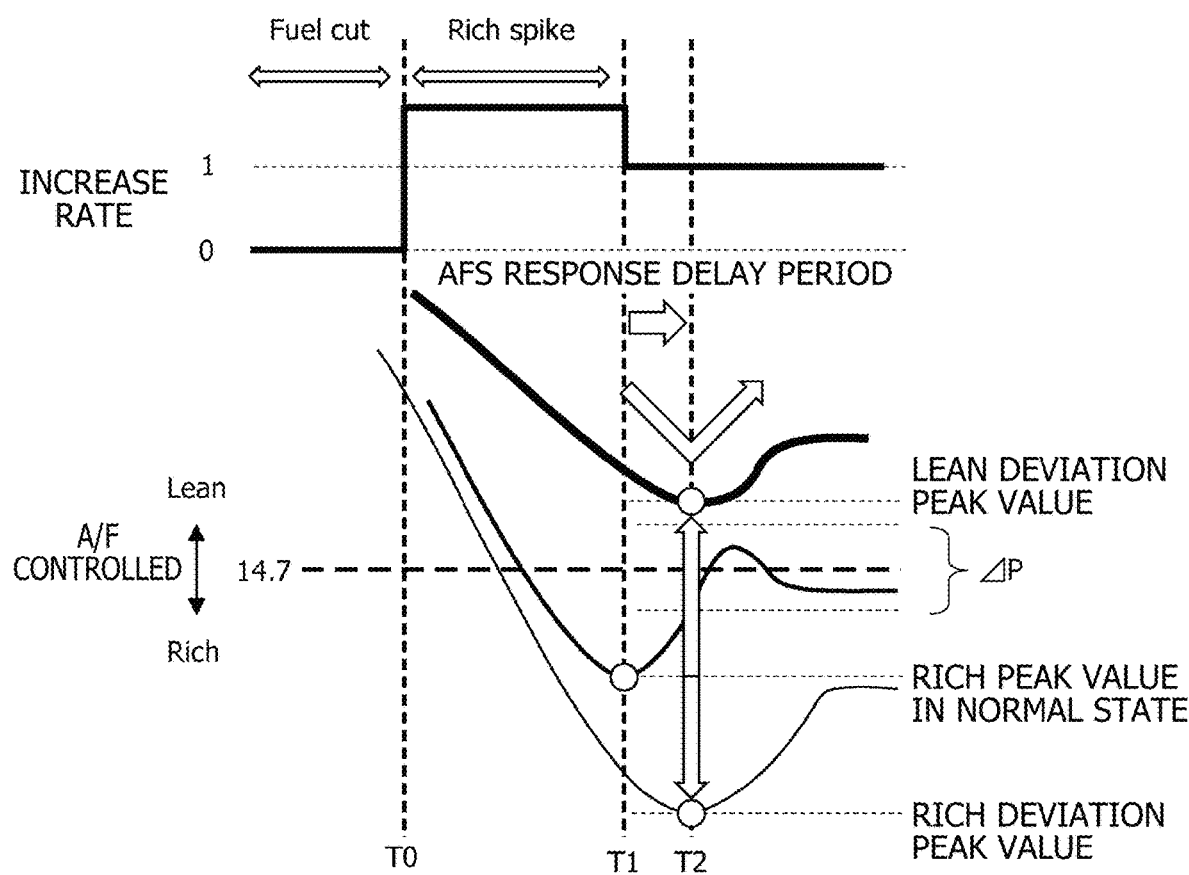
FIG. 7 illustrates a method for determining rich or lean deviation of the air-fuel ratio. Specifically.
Figure 8:
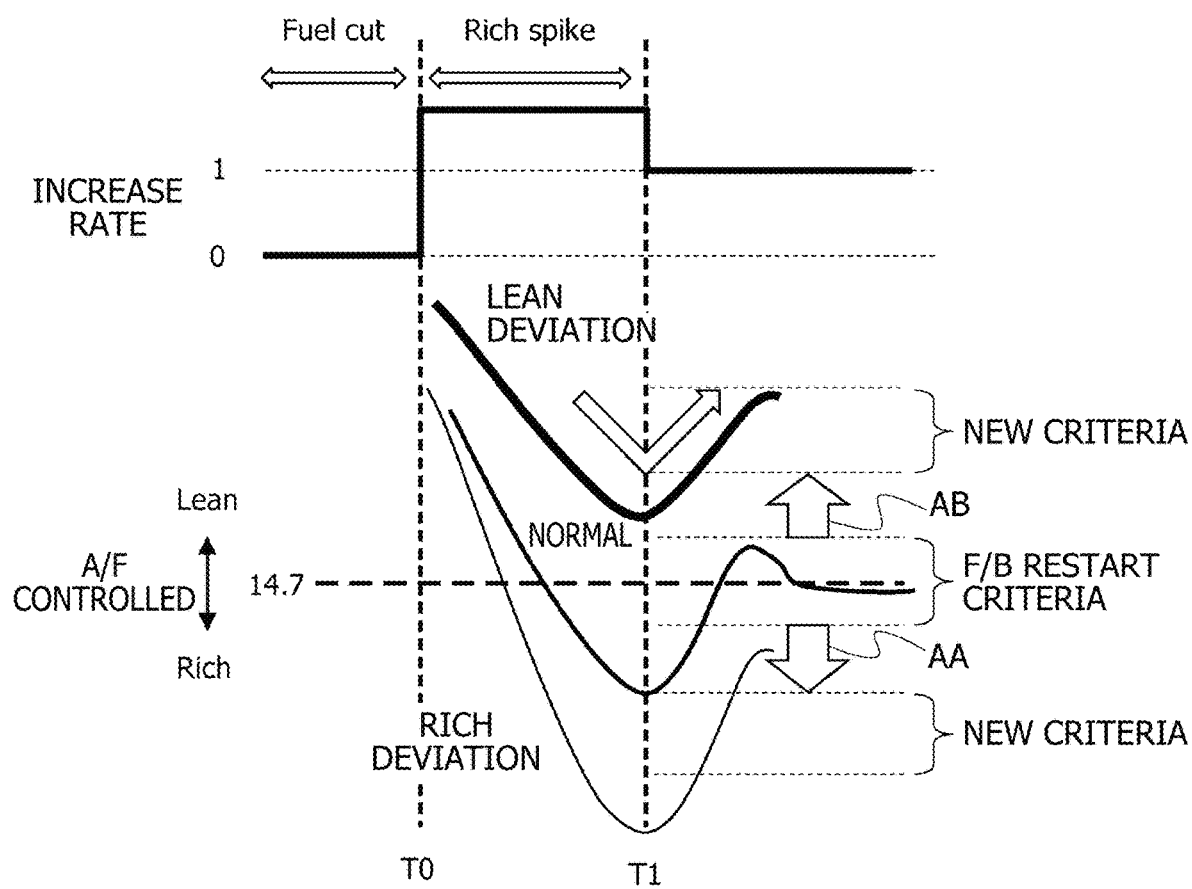
FIG. 8 illustrates criteria used when air-fuel ratio feedback restarts based on the air-fuel ratio deviation state. Specifically.
Figure 9:
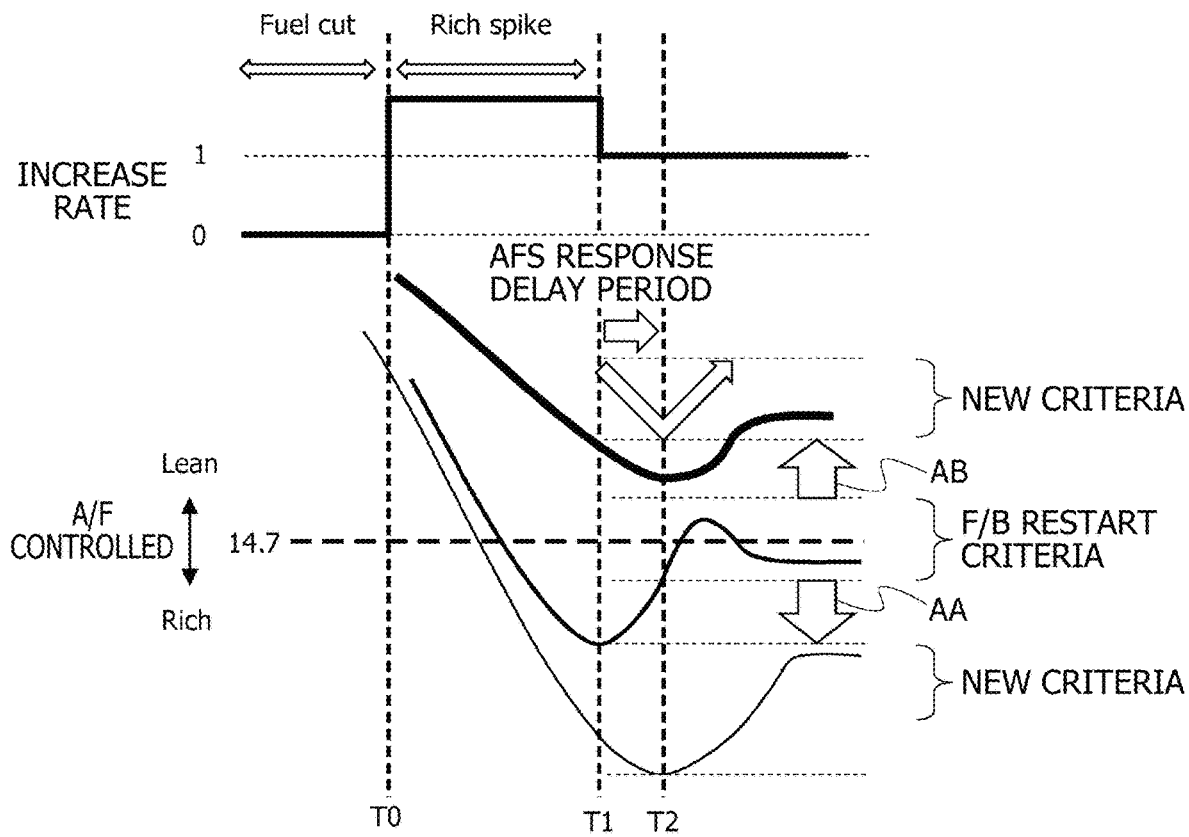
FIG. 9 illustrates criteria used when the air-fuel ratio feedback restarts based on the air-fuel ratio deviation state. Specifically.

FIGS. 6 and 7 illustrate methods for determining rich and lean deviation of the air-fuel ratio. Specifically, FIG. 6 is a waveform diagram in which the air-fuel ratio is deviated and there is no response delay of the air-fuel ratio, and FIG. 7 is a waveform diagram in which the air-fuel ratio is deviated and there is a response delay of the air-fuel ratio. FIGS. 8 and 9 illustrate criteria used when air-fuel ratio feedback restarts based on the air-fuel ratio deviation state. Specifically, FIG. 8 is a waveform diagram in which the air-fuel ratio is deviated and there is no response delay of the air-fuel ratio, and FIG. 9 is a waveform diagram in which the air-fuel ratio is deviated and there is a response delay of the air-fuel ratio.

As illustrated in FIG. 6, in a normal state, the rich-side peak value temporarily deviates from a predetermined range ΔP having an ideal air-fuel ratio (14.7) as its center. However, the air-fuel ratio falls within the predetermined range ΔP within a short time. A rich deviation or lean deviation of the air-fuel ratio is determined based on the magnitude of the gap from the rich-side peak of the air-fuel ratio. This rich-side peak is a value obtained when the change direction of the air-fuel ratio inverts from the rich direction to the lean direction.

In FIG. 7, unlike FIG. 6, there is an AFS response delay period between time T1 and time T2. However, the waveforms are the same as those in FIG. 6 after time T2. Even when there is a response delay of the air-fuel ratio, the worsening of the emissions practically occurs only between time T1 and time T2, and therefore, the emissions are little affected.

As illustrated in FIG. 8, there is a case in which the air-fuel ratio deviates to the rich side from its normal value, and there is a case in which the air-fuel ratio deviates to the lean side from its normal value. Thus, when the air-fuel ratio deviates to the rich side from its normal value, the feedback control restart criteria having the ideal air-fuel ratio (14.7) in its center are changed (shifted) as illustrated by an arrow AA. In contrast, when the air-fuel ratio deviates to the lean side from its normal value, the feedback control restart criteria set having the ideal air-fuel ratio (14.7) in its center are changed (shifted) as illustrated by an arrow AB.

In FIG. 9, unlike FIG. 8, there is an AFS response delay period between time T1 and time T2. However, the waveforms are the same as those in FIG. 8 after time T2. Even when there is a response delay of the air-fuel ratio, the worsening of the emissions practically occurs only between time T1 and time T2, and therefore, the emissions are little affected.

Figure 10:
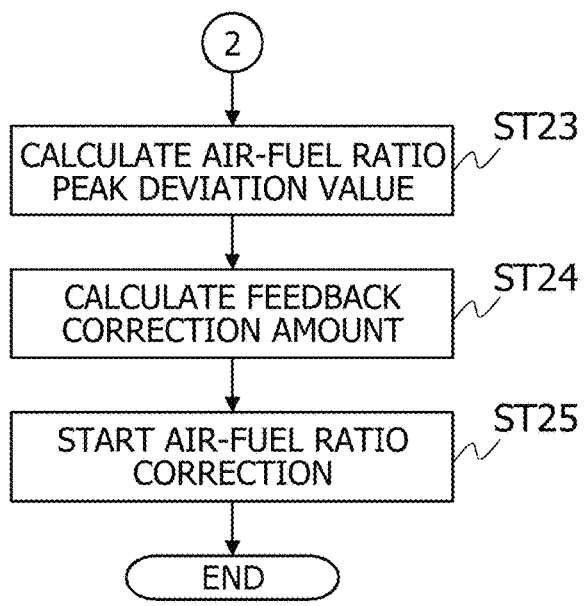
FIG. 10 is a flowchart illustrating a feedback correction amount calculation operation following FIG. 4.

FIG. 10 illustrates a feedback correction amount calculation operation executed by feedback correction amount calculation unit 515. After the end of the fuel supply increase, if the timer count value becomes greater than or equal to the criteria or if the air-fuel ratio becomes greater than or equal to the first criteria and becomes less than or equal to the second criteria, feedback correction amount calculation unit 515 calculates an air-fuel ratio peak deviation value (step ST23), and calculates a feedback correction amount based on this air-fuel ratio peak deviation value (step ST24). Next, feedback correction amount calculation unit 515 starts air-fuel ratio correction based on this feedback correction amount (step ST25). In this way, feedback correction amount calculation unit 515 changes the feedback gain change amount of the air-fuel ratio control based on the set air-fuel ratio criteria. After the end of the fuel cut recovery, if the air-fuel ratio exceeds the determined criteria, the air-fuel ratio feedback restarts.

Figures 11, 12:
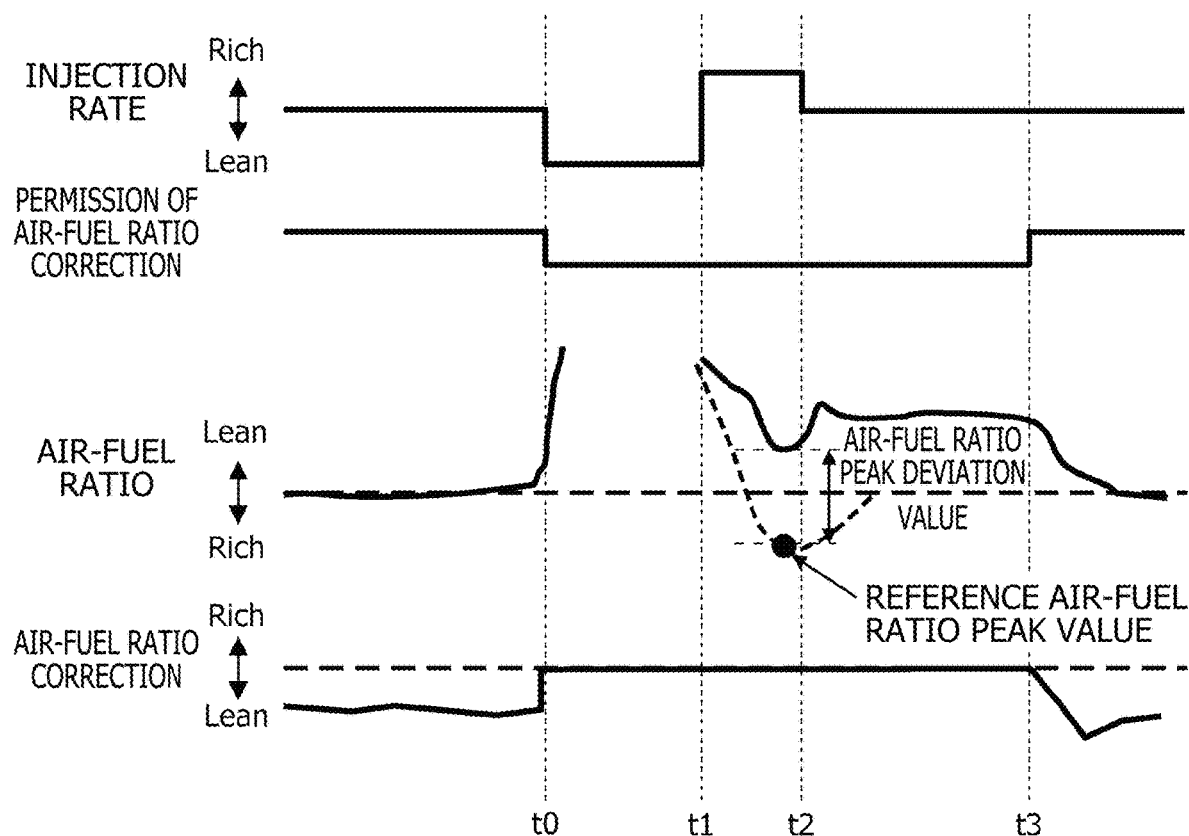
FIG. 11 illustrates calculation of the air-fuel ratio correction start criteria in FIG. 10.
FIG. 12 is a timing chart illustrating calculation of air-fuel deviation.

FIG. 11 illustrates calculation of the air-fuel ratio correction start criteria in FIG. 10. FIG. 11 illustrates an input-output relationship used when the feedback correction amount is calculated in step ST24. If the input (air-fuel ratio deviation value) changes from "−2.0", "−1.5", "−1.0", "−0.5", "0.5", "1.0", "1.5", to "2.0", the output changes from "0.05", "0.03", "0.02", "0.01", "0.01", "0.02", "0.03", to "0.05". When the deviation of the rich-side peak value of the air-fuel ratio is larger, it is preferable that a smaller feedback gain change amount be set.

FIG. 12 is a timing chart illustrating calculation of air-fuel deviation. At time t0, a fuel cut of internal combustion engine 11 is executed, correction of the air-fuel ratio is prohibited, and the air-fuel ratio correction is stopped. Next, at time t1, when ON of acceleration is detected by accelerator position signal ACC, a fuel cut recovery is executed, and combustion by the internal combustion engine 11 starts again. Between time t1 and time t2, the fuel is increased (rich spike) and supplied, with the air-fuel ratio feedback stopped.

In this state, the measured value of the air-fuel ratio as indicated by a solid line deviates from a target air-fuel ratio as indicated by a dashed line from the rich spike to the restart of the air-fuel ratio feedback control. The difference between the reference air-fuel ratio peak value and the measured value is the air-fuel ratio peak deviation value.

Next, after a predetermined time, when the correction of the air-fuel ratio is permitted at time t3, the air-fuel ratio feedback control restarts, the deviation amount of the air-fuel ratio gradually decreases, and the air-fuel ratio comes close to the target air-fuel ratio.

Figure 13:
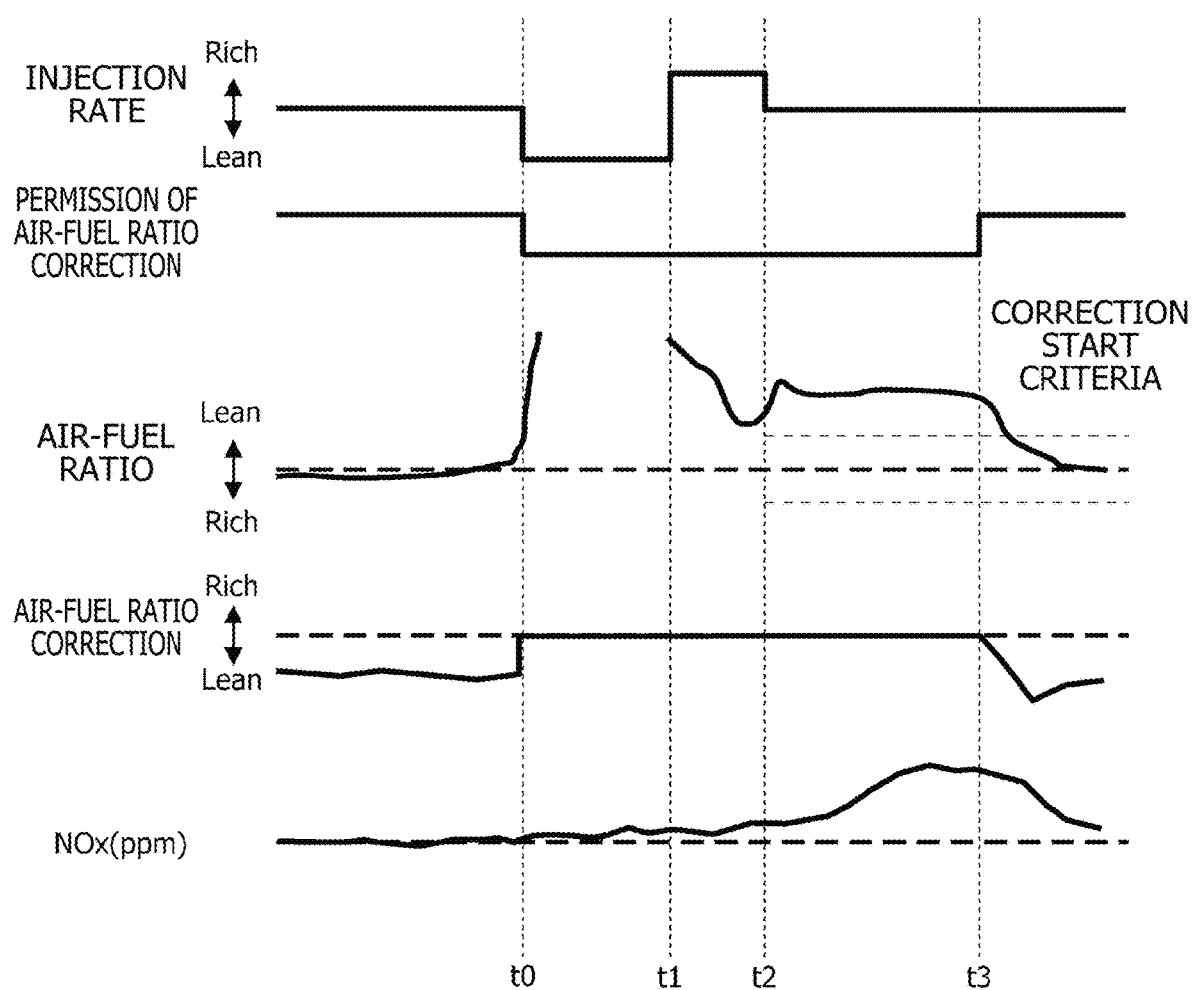
FIG. 13 is a timing chart illustrating the air-fuel ratio, the air-fuel ratio correction, and the NOx generation state obtained by a conventional internal combustion engine control method.
Figure 14:
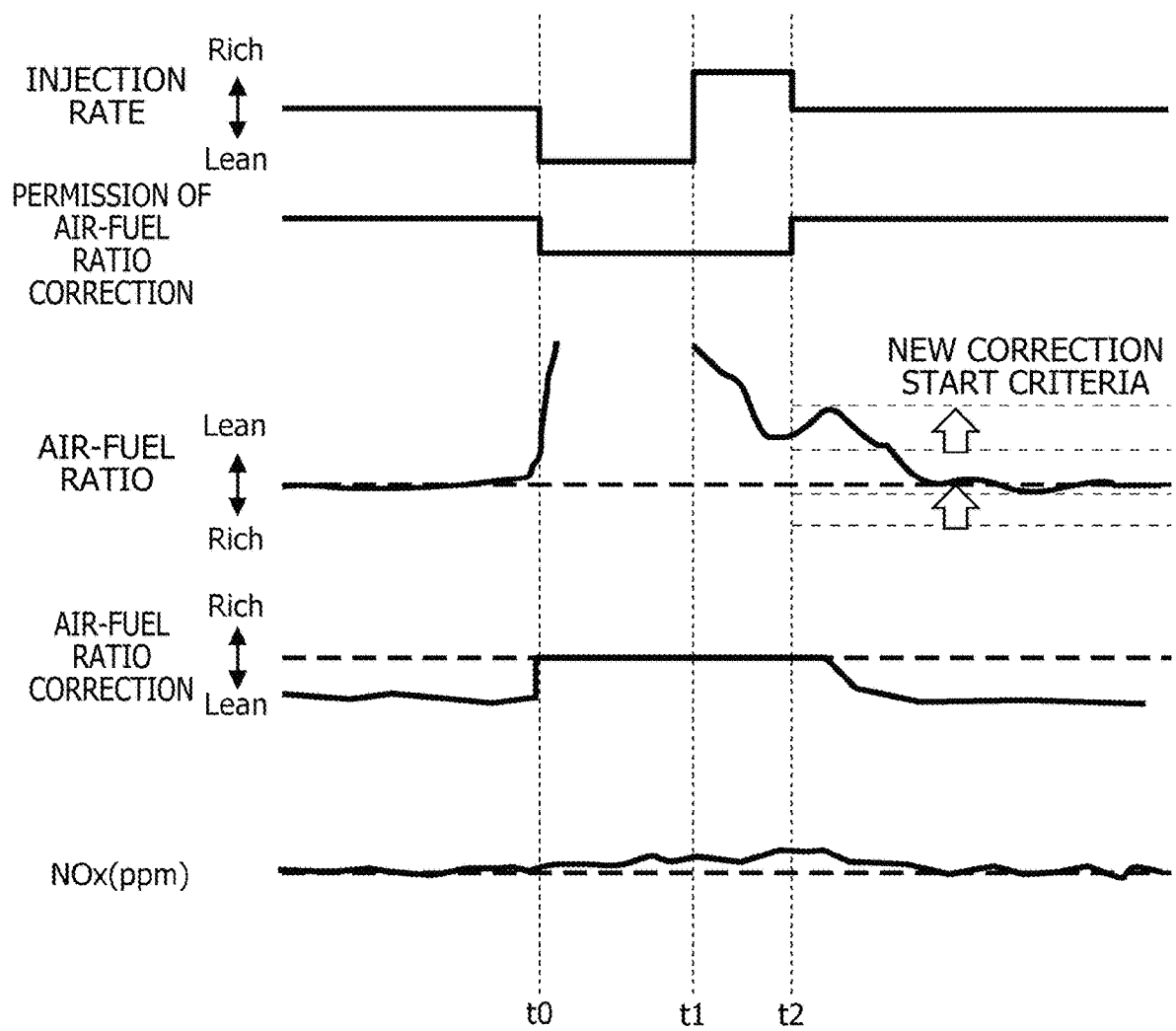
FIG. 14 is a timing chart illustrating the air-fuel ratio, the air-fuel ratio correction, and the NOx generation state obtained by the internal combustion engine control method according to the example of the present invention.

FIG. 13 illustrates the air-fuel ratio, the air-fuel ratio correction, and the NOx generation state obtained by a conventional internal combustion engine control method, and FIG. 14 illustrates the air-fuel ratio, the air-fuel ratio correction, and the NOx generation state obtained by the internal combustion engine control method according to the example of the present invention. As illustrated in FIG. 13, conventionally, between time t2 and time t3, that is, from a rich spike to the restart of the air-fuel ratio feedback control, because the air-fuel ratio deviates from the target air-fuel ratio, the NOx deteriorates, creating an adverse effect even after time t3 at which the air-fuel ratio feedback control starts.

In contrast, according to the present invention, air-fuel ratio criteria are set based on a rich-side peak value of the air-fuel ratio obtained after the start of the fuel supply increase at a fuel cut recovery, and the air-fuel ratio feedback control can be appropriately and quickly restarted after recovery from the fuel cut, without waiting for elapse of a predetermined time-out period.

Thus, it is possible to provide an apparatus and a method for controlling an internal combustion engine such that emissions may not worsen during recovery from a fuel cut.

As described above, according to the present invention, the accuracy of the air-fuel ratio control can be improved, and the emissions worsening due to deviation of the air-fuel ratio can be lessened. As a result, it has been confirmed that regulation values of ULEV (ultralow emissions vehicle) 50 are satisfied. In addition, because no new devices or parts are needed, the costs for exhaust gas measures can also be reduced.

Thus, it is possible to obtain an apparatus and a method for controlling an internal combustion engine such that emissions may not worsen during recovery from a fuel cut.

The configuration, control method, etc., in the above example have been roughly described to such an extent that the present invention can be understood and carried out. Thus, the present invention is not limited to the above example, and it can be modified in various modes, without departing from the scope of the technical concept as claimed in the claims.

REFERENCE SYMBOL LIST

11 Internal combustion engine
12 Air flow meter
31 First exhaust purification catalyst
34 Air-fuel ratio sensor
35 Oxygen sensor (exhaust sensor)
51 Control apparatus
51A Microcomputer
51A1 Microprocessor
51A2 Non-volatile memory
511 Air-fuel ratio control unit
512 Measuring unit
513 Control determination unit
514 Criteria calculation unit
515 Feedback correction amount calculation unit

The invention claimed is:

1. An internal combustion engine control apparatus that executes feedback control on an air-fuel ratio of an internal combustion engine, wherein the control apparatus is configured to:
   increase a supply of fuel, with the air-fuel ratio feedback stopped, when combustion restarts after a fuel cut of the internal combustion engine;
   set air-fuel ratio criteria based on a rich-side peak value of the air-fuel ratio obtained after the fuel supply increase starts; and
   start the air-fuel ratio feedback when the air-fuel ratio falls within the set air-fuel ratio criteria after the fuel supply increase.

2. The internal combustion engine control apparatus according to claim 1, wherein the setting of the air-fuel ratio criteria by the control apparatus includes changing a preset reference value of the air-fuel ratio criteria based on the rich-side peak value of the air-fuel ratio when the air-fuel ratio feedback restarts.

3. The internal combustion engine control apparatus according to claim 1, wherein the control apparatus is configured to start the air-fuel ratio feedback control based on a predetermined time-out period if the air-fuel ratio does not fall within the set air-fuel ratio criteria.

4. The internal combustion engine control apparatus according to claim 1, wherein the rich-side peak value of the air-fuel ratio is a value obtained when the air-fuel ratio inverts from a rich side to a lean side.

5. The internal combustion engine control apparatus according to claim 1, wherein the control apparatus is configured to start the air-fuel ratio feedback control based on the rich-side peak value when the fuel supply increase ends if the rich-side peak of the air-fuel ratio occurs during a fuel supply increase period.

6. The internal combustion engine control apparatus according to claim 1, wherein the control apparatus is configured to set a reference value for the rich-side peak value of the air-fuel ratio, and to calculate the air-fuel ratio criteria based on a deviation between the reference value and an actual air-fuel ratio rich-side peak value.

7. The internal combustion engine control apparatus according to claim 6, wherein the control apparatus is configured to set the air-fuel ratio criteria to a rich side when the deviation is on the rich side and to set the air-fuel ratio criteria to a lean side when the deviation is on the lean side.

8. The internal combustion engine control apparatus according to claim 1, wherein the set air-fuel ratio criteria are located further on the lean side than the rich-side peak value of the air-fuel ratio.

9. The internal combustion engine control apparatus according to claim 1, wherein the control apparatus is configured to change a feedback gain change amount of the air-fuel ratio control based on the set air-fuel ratio criteria.

10. The internal combustion engine control apparatus according to claim 9, wherein the control apparatus is configured to reduce the feedback gain change amount when deviation of the rich-side peak value of the air-fuel ratio is large.

11. An internal combustion engine control method for executing feedback control on an air-fuel ratio of an internal combustion engine, wherein the control method includes:

cutting fuel supply to the internal combustion engine;
increasing a supply of fuel to the internal combustion engine, with the air-fuel ratio feedback stopped, when combustion of the internal combustion engine restarts after the cutting of the fuel supply;
setting air-fuel ratio criteria based on a rich-side peak value of the air-fuel ratio obtained after the fuel supply increase starts; and
starting control of the internal combustion engine based on the air-fuel ratio feedback when the air-fuel ratio falls within the set air-fuel ratio criteria after the fuel supply increase.

* * * * *